United States Patent [19]
Cruz

[11] Patent Number: 5,531,443
[45] Date of Patent: Jul. 2, 1996

[54] KEYPAD CONTROLLER FOR USE WITH A VIDEO GAME

[76] Inventor: Jose L. Cruz, 138-16-407st V. Carolina, Carolina, Puerto Rico, 00985

[21] Appl. No.: 304,884

[22] Filed: Sep. 13, 1994

[51] Int. Cl.⁶ ........................................... A63F 9/22
[52] U.S. Cl. ........................................... 463/37
[58] Field of Search ................... 273/433, 434, 273/435, 438, 148 B

[56] References Cited

U.S. PATENT DOCUMENTS

| | | | |
|---|---|---|---|
| 4,552,360 | 11/1985 | Bromley et al. | 273/438 X |
| 4,720,789 | 1/1988 | Hector et al. | 273/438 X |
| 5,213,327 | 5/1993 | Kitaue | 273/438 X |

Primary Examiner—Raleigh W. Chiu

[57] ABSTRACT

A keypad controller for use with a video game comprising a housing; a cable connector mechanism extended from the housing and coupleable to a plug end of a cable for connection and communication with a video game; and a plurality of actuateable directional switches each coupled to the cable connector mechanism and extended from the housing with each directional switch associated with a compass direction and with each directional switch generating a unique signal when actuated for controlling the direction of events of a video game.

2 Claims, 4 Drawing Sheets

1

KEYPAD CONTROLLER FOR USE WITH A VIDEO GAME

BACKGROUND OF THE INVENTION

1. Field of the Invention

The present invention relates to a keypad controller for use with a video game and more particularly pertains to generating directional and activation signals for controlling the direction and activation of events during play of a video game with a keypad controller for use with a video game.

2. Description of the Prior Art

The use of keypad controllers for joystick mechanisms is known in the prior art. More specifically, keypad controllers for joystick mechanisms heretofore devised and utilized for the purpose of controlling play of a video game are known to consist basically of familiar, expected and obvious structural configurations, notwithstanding the myriad of designs encompassed by the crowded prior art which have been developed for the fulfillment of countless objectives and requirements.

By way of example, U.S. Pat. No. Des. 311,385 to Arkin discloses a computer keypad. U.S. Pat. No. Des. 327,881 to McFarlane discloses a computer keypad. U.S. Pat. No. 4,439,647 to Calandrello et al. discloses a touch pad keyboard. U.S. Pat. No. 5,088,928 to Chan discloses an educational/board game apparatus. U.S. Pat. No. 5,243,331 to McCauslannd et al. discloses a keypad for computer system.

While these devices fulfill their respective, particular objective and requirements, the aforementioned patents do not describe a keypad controller for use with a video game that allows the discrete control of the direction of events through a plurality of individually activated switches, thereby providing a user increased accuracy of directional control during play.

In this respect, the keypad controller for use with a video game according to the present invention substantially departs from the conventional concepts and designs of the prior art, and in doing so provides an apparatus primarily developed for the purpose of generating directional and activation signals for controlling the direction and activation of events during play of a video game.

Therefore, it can be appreciated that there exists a continuing need for new and improved keypad controller for use with a video game which can be used for generating directional and activation signals for controlling the direction and activation of events during play of a video game. In this regard, the present invention substantially fulfills this need.

SUMMARY OF THE INVENTION

In the view of the foregoing disadvantages inherent in the known types of keypad controllers for joystick mechanisms now present in the prior art, the present invention provides an improved keypad controller for use with a video game. As such, the general purpose of the present invention, which will be described subsequently in greater detail, is to provide a new and improved keypad controller for use with a video game and method which has all the advantages of the prior art and none of the disadvantages.

To attain this, the present invention essentially comprises, in combination, a housing having a bottom wall, top wall, and a periphery interconnecting the top wall with the bottom wall. The periphery further includes a front wall, a rear wall, and two opposed and outwardly curved side walls with the side walls defining handles for allowing a user a firm grip.

A cable connector is included and extended from the rear wall of the housing and coupleable to a plug end of a cable for connection and communication with a video game. The cable connector has a north terminal, a south terminal, an east terminal, a west terminal, event terminal, and ground terminal. Eight depressible directional switches are coupled to and extended from the top wall of the housing with four of the switches each located at a vertex of an imaginary square disposed upon the top wall to thereby define a northwest switch, a northeast switch, a southeast switch, and a southwest switch and with the remaining four switches each generally positioned between each pair of vertices of the imaginary square to define a north switch, a south switch, an east switch, and a west switch. Each switch has an cathode terminal and a anode terminal with each anode terminal coupled to the ground terminal of the cable connector and with the cathode terminal of the north switch coupled to the north terminal of the cable connector, the cathode terminal of the south switch coupled to the south terminal of the cable connector, the cathode terminal of the east switch coupled to the east terminal of the cable connector, and the cathode terminal of the west switch coupled to the west terminal of the cable connector.

A first diode, a second diode, a third diode, a fourth diode, a fifth diode, a sixth diode, a seventh diode, and an eighth diode are included. The first diode has an anode terminal coupled to the cathode terminal of the northwest switch and a cathode terminal coupled to the north terminal of the cable connector. The second diode has an anode terminal coupled to the cathode terminal of northeast switch and a cathode terminal coupled to the north terminal of the cable connector. The third diode has an anode terminal coupled to the cathode terminal of the northeast switch and a cathode terminal coupled to the east terminal of the cable connector. The fourth diode has an anode terminal coupled to the cathode terminal of the southeast switch and a cathode terminal coupled to the east terminal of the cable connector. The fifth diode has an anode terminal coupled to the cathode terminal of the southeast switch and a cathode terminal coupled to the south terminal of the cable connector. The sixth diode has an anode terminal coupled to the cathode terminal of the southwest switch and a cathode terminal coupled to the south terminal of the cable connector. The seventh diode has an anode terminal coupled to the cathode terminal of the southwest switch and a cathode terminal coupled to the west terminal of the cable connector. Lastly, the eighth diode has an anode terminal coupled to the cathode terminal of the northwest switch and a cathode terminal coupled to the west terminal of the cable connector. Depression of the north switch generates a north directional signal. Depression of the south switch generates a south directional signal. Depression of the east switch generates an east directional signal. Depression of the west switch generates a west directional signal. Depression of the northeast switch generates a north directional signal and east directional signal. Depression of the southeast switch generates a south directional signal and an east directional signal. Depression of the southwest switch generates a south directional signal and a west directional signal. Lastly, depression of the northwest switch generates a north directional signal and a west directional signal. Two pairs of actuation switches are included and extended from the rear wall of the housing. Each pair of actuation switches is formed of a depressible action switch and a lock switch. The action switch has a cathode terminal coupled to the event terminal of the cable connector and an anode terminal connected to the ground terminal of the cable connector. Depression of the action switch generates an activation signal. The lock switch is coupled to the action switch and has an activated orientation for allowing the continual generation of the activation signal and a de-activated orientation for preventing such continual generation.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved keypad controller for use with a video game which has all the advantages of the prior art keypad controllers for joystick mechanisms and none of the disadvantages.

It is another object of the present invention to provide a new and improved keypad controller for use with a video game which may be easily and efficiently manufactured and marketed.

It is a further object of the present invention to provide a new and improved keypad controller for use with a video game which is of durable and reliable construction.

An even further object of the present invention is to provide a new and improved keypad controller for use with a video game which is susceptible of a low cost of manufacture with regard to both materials and labor, and which accordingly is then susceptible of low prices of sale to the consuming public, thereby making such a keypad controller for use with a video game economically available to the buying public.

Still yet another object of the+present invention is to provide a new and improved keypad controller for use with a video game which provides in the apparatuses and methods of the prior art some of the advantages thereof, while simultaneously overcoming some of the disadvantages normally associated therewith.

Even still another object of the present invention is to provide a new and improved keypad controller for use with a video game for generating directional and activation signals for controlling the direction and activation of events during play of a video game.

Lastly, it is an object of the present invention to provide a new and improved keypad controller for use with a video game comprising a housing; cable connector means extended from the housing and coupleable to a plug end of a cable for connection and communication with a video game; and a plurality of actuateable directional switches each coupled to the cable connector means and extended from the housing, each switch associated with a compass direction, each switch generating a unique signal when actuated for controlling the direction of events of a video game.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts through the various Figures.

DESCRIPTION OF THE PREFERRED EMBODIMENT

Figure 1:
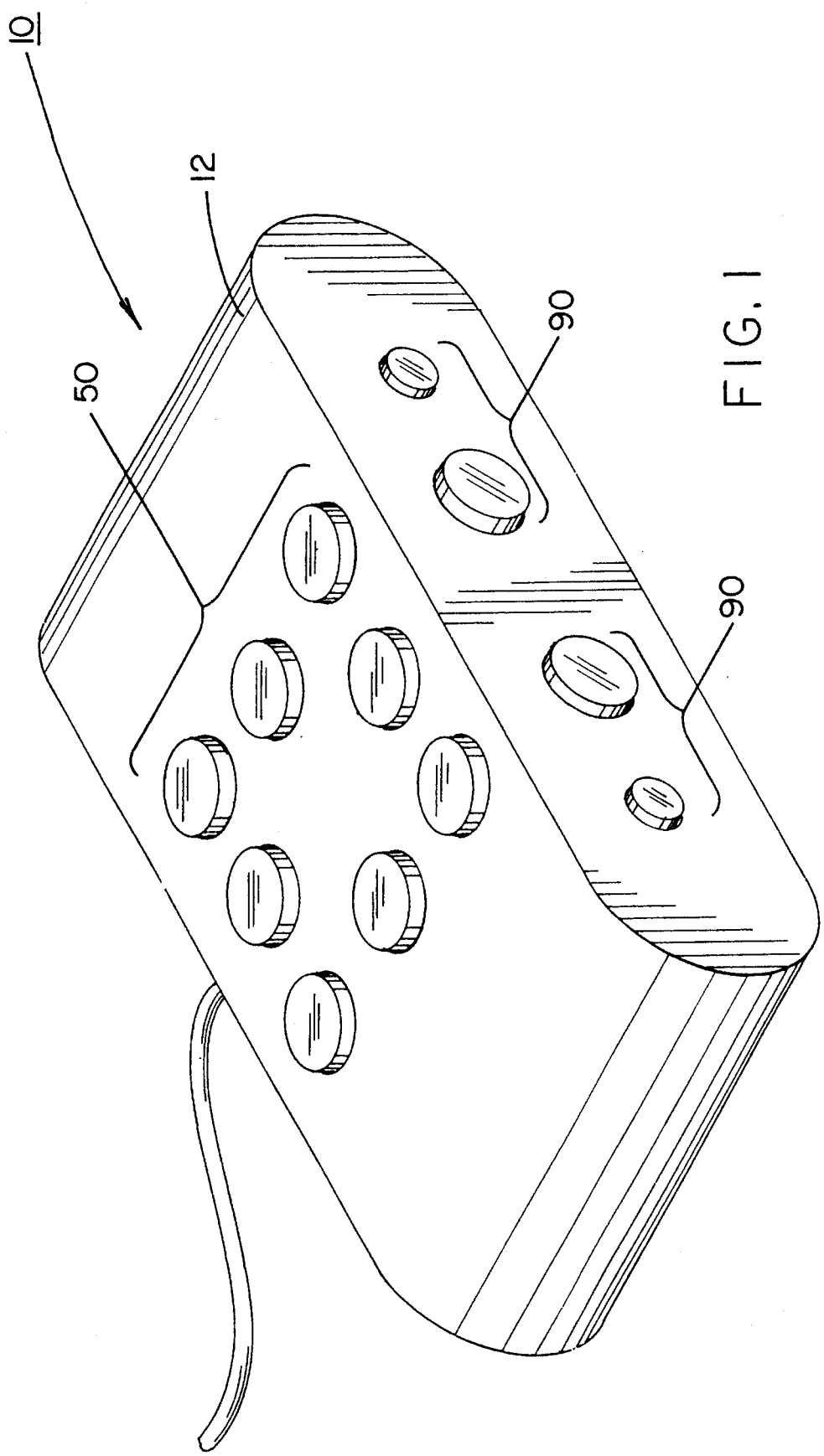
FIG. 1 is a perspective view of the preferred embodiment of the keypad controller for use with a video game constructed in accordance with the principles of the present invention.
Figure 2:
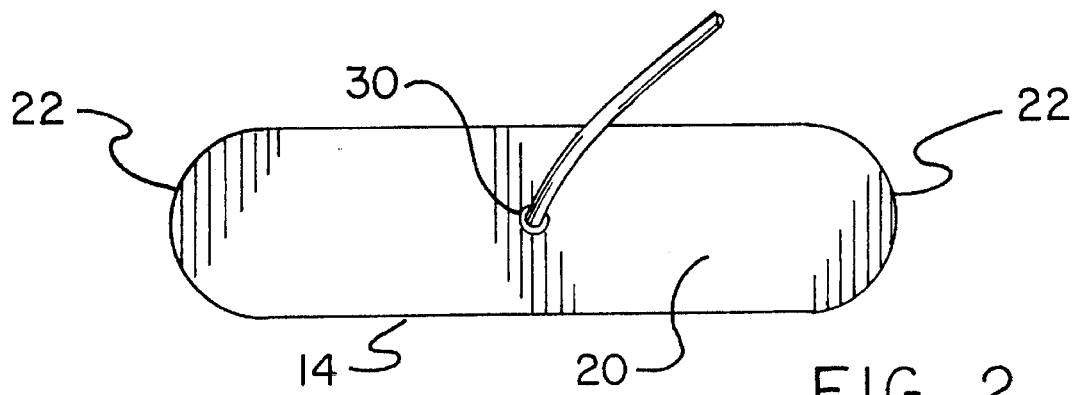
FIG. 2 is a side-elevational view of the present invention depicting the coupling of the cable connector with the cable of a video game or computer upon which the video game is executing.
Figure 3:
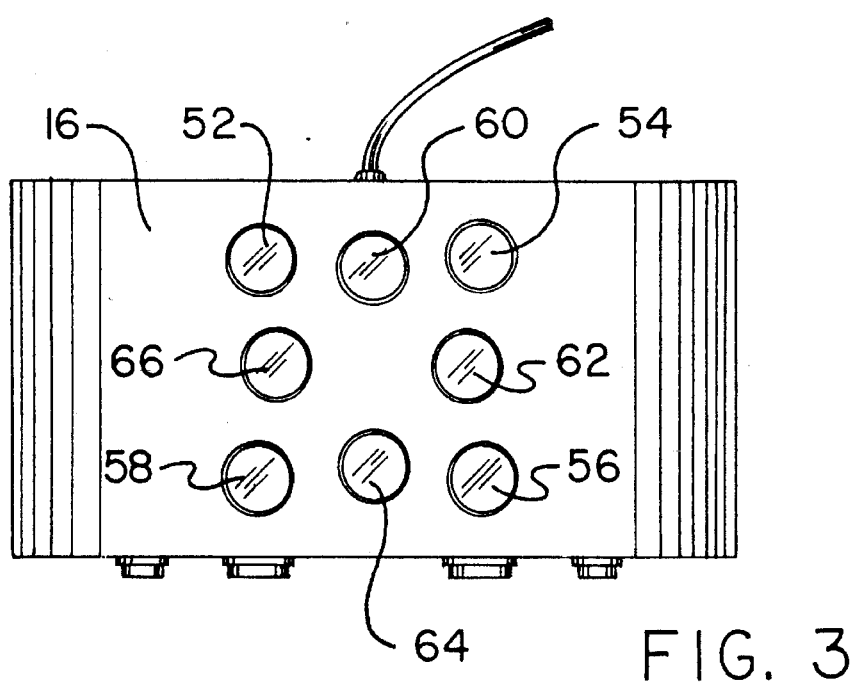
FIG. 3 is a plan view of the present invention depicting the relative positioning of the directional switches.
Figure 4:
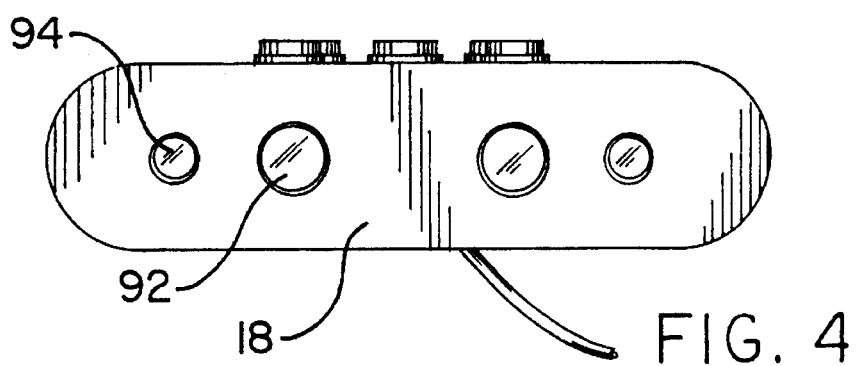
FIG. 4 is yet another side-elevational view of the present invention depicting the relative positioning of the activation switches.
Figure 5:
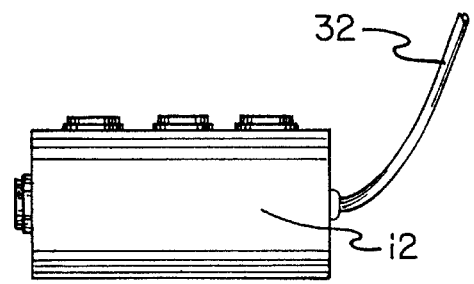
FIG. 5 is still yet another side-elevational view of the present invention.
Figure 6:
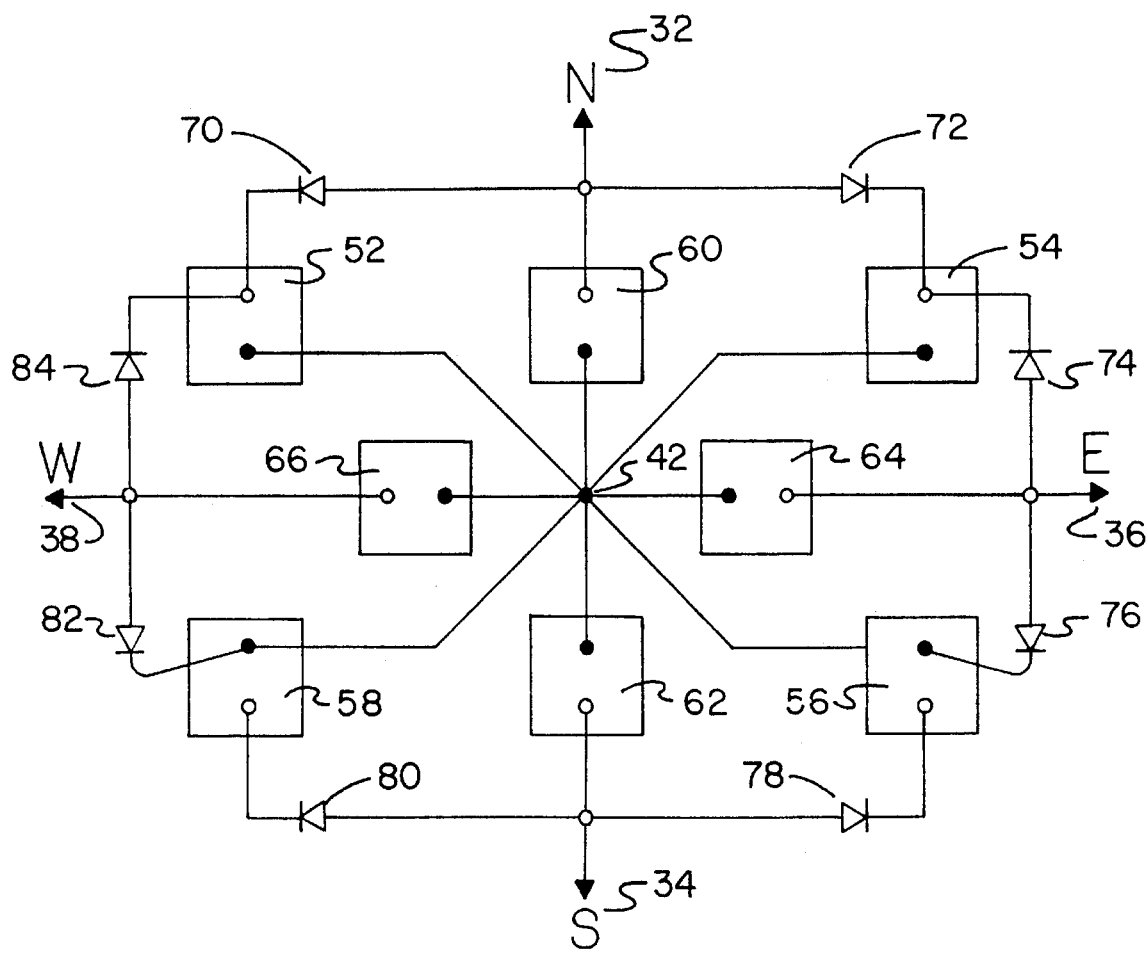
FIG. 6 is an electrical schematic diagram of the directional switches of the present invention.

With reference now to the drawings, and in particular, to FIG. 1 thereof, the preferred embodiment of the new and improved keypad controller for use with a video game embodying the principles and concepts of the present invention and generally designated by the reference number 10 will be described.

Specifically, the preferred embodiment the present invention essentially includes five major components. The major components are the housing, cable connector, directional switches, diodes, and actuation switches. These components are interrelated to provide the intended function of generating directional and activation signals for controlling the direction and activation of events during play of a video game.

More specifically, it will be noted in the various Figures that the first major component is the housing 12. The housing is formed of plastic or other similar rigid material. The housing has a bottom wall 14, a top wall 16, and a periphery interconnecting the top wall with the bottom wall. The periphery is further formed of a front wall 18, a rear wall 20, and two opposed and outwardly curved side walls 22. The side walls define handles for allowing a user a firm grip during play.

The second major component is the cable connector 30. The cable connector is electrically conductive and extended from the rear wall 20 of the housing. The cable connector is coupleable to a plug end of a video game cable for connection and communication therewith. This video game may be one that is commercially available in a stand-alone arcade form or one that executes upon a commercially available personal computer. The cable connector has a north terminal 32, a south terminal 34, an east terminal 36, a west terminal 38, an event terminal 40, and a ground terminal 42. The terminals provide signals to the video game based upon user actuation for controlling operation thereof.

The third major component is the directional switches 50. The present-invention includes eight depressible directional switches. The directional switches are coupled to and extended from the front wall of the housing. Four of the switches are each located at a separate vertex of an imaginary square disposed upon the top wall to thereby define a northwest switch 52, a northeast switch 54, a southeast switch 56, and a southwest switch 58. The four remaining switches are each generally positioned between each pair of vertices of the imaginary square to thereby define a north switch 60, a south switch 62, an east switch 64, and a west switch 66. Each directional switch has a cathode terminal and an anode terminal. The anode terminal of each directional switch is coupled to the ground terminal 42 of the cable connector. The cathode terminal of the north switch is coupled to the north terminal of the cable connector 30. The cathode terminal of the south switch is coupled to the south terminal 34 of the cable connector. The cathode terminal of the east switch is coupled to the east terminal 36 of the cable connector. The cathode terminal of the west switch is coupled to the west terminal 38 of the cable connector.

The fourth major component of the present invention is the diodes. The present invention includes a first diode 70, a second diode 72, a third diode 74, a fourth diode 76, a fifth diode 78, a sixth diode 80, a seventh diode 82, and an eighth diode 84. The first diode has an anode terminal coupled to the cathode terminal of the northwest switch 52 and a cathode terminal coupled to the north terminal 32 of the cable connector. The second diode has an anode terminal coupled to the cathode terminal of the northeast switch 54 and a cathode terminal coupled to the north terminal 32 of the cable connector. The third diode has an anode terminal coupled to the cathode terminal of the northeast switch 54 and a cathode terminal coupled to the east terminal 36 of the cable connector. The fourth diode has an anode terminal coupled to the cathode terminal of the southeast switch 56 and a cathode terminal coupled to the east terminal 36 of the cable connector. The fifth diode has an anode terminal coupled to the cathode terminal of the southeast switch 56 and a cathode terminal coupled to the south terminal 34 of the cable connector. The sixth diode has an anode terminal coupled to the cathode terminal of the southwest switch 58 and a cathode terminal coupled to the south terminal 34 of the cable connector. The seventh diode has an anode terminal coupled to the cathode terminal of the southwest switch 58 and a cathode terminal coupled to the west terminal 38 of the cable connector. The eighth diode has an anode terminal coupled to the cathode terminal of the northwest switch 52 and a cathode terminal coupled to the west terminal 38 of the cable connector. The diodes are used for ensuring that when a given directional switch is activated, the adjacent directional switches are not inadvertently activated. For example, when the north switch 60 is depressed, current flows therethrough, and this current is subsequently blocked from activating the northeast switch 54 and the north west switch 52 due to the third diode 74 and the eight diode 84. Thus, depression of the north switch generates a north directional signal, depression of the south switch generates a south directional signal, depression of the east switch generates an east directional signal, and depression of the west switch generates a west directional signal. Since the cable connector has only four active terminals for indicating direction that are coupleable to the video game cable, directional signals representing directions other than north, south, east, and west are formed through a combination of related signals. Therefore, depression of the northeast switch generates a north directional signal and an east directional signal, depression of the southeast switch generates a south directional signal and an east directional signal, depression of the southwest switch generates a south directional signal and a west directional signal, and depression of the northwest switch generates a north directional signal and a west directional signal. When these signals are received, associated electronic circuitry in the video game decodes the two signal combination to determine the appropriate compass direction.

The fifth major component is the actuation switches 90. The present invention includes two pairs of actuation switches. The actuation switches are extended from the front wall 18 of the housing. Each pair of actuation switches is formed of a depressible action switch 92 and a lock switch 94. The action switch has a cathode terminal coupled to the event terminal of the cable connector and an anode terminal coupled to the ground terminal of the cable connector. Depression of the action switch generates an activation signal for transmission to the video game. The lock switch is coupled with the action switch. The lock switch has an activated orientation for allowing the continual generation of the activation signal and a de-activated orientation for preventing such continual generation. The lock switch could be utilized by a user to sustain a continual rate of fire in a target game, for example.

Figure 7:
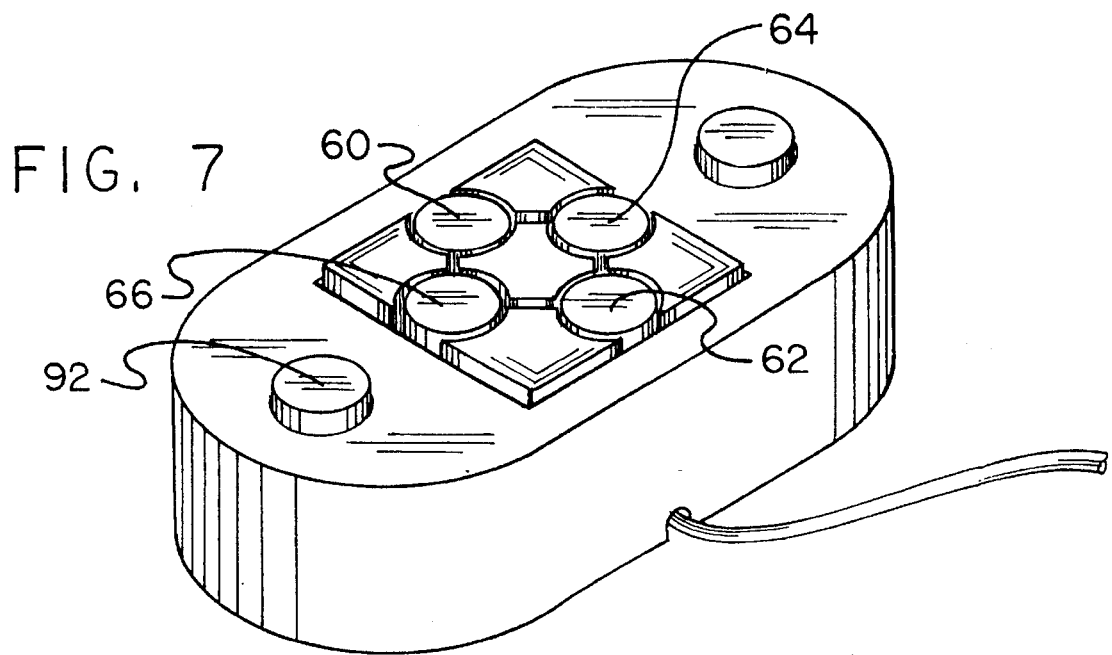
FIG. 7 is a perspective view of an alternate embodiment of the present invention employing only four directional switches and two activation switches extended from the top wall of the housing.

A second embodiment of the present invention is shown in FIG. 7. In this embodiment, the directional switches consist of the north switch 60, the south switch 64, the east switch 62, and the west switch 66. The directional switches are each located at a vertice of an imaginary square disposed upon the housing. The switches are further extended into a contact pad for preventing their inadvertent actuation during play. The second embodiment also includes a pair of action switches 92. The action switches are located on opposite sides of the directional switches.

Figure 8:
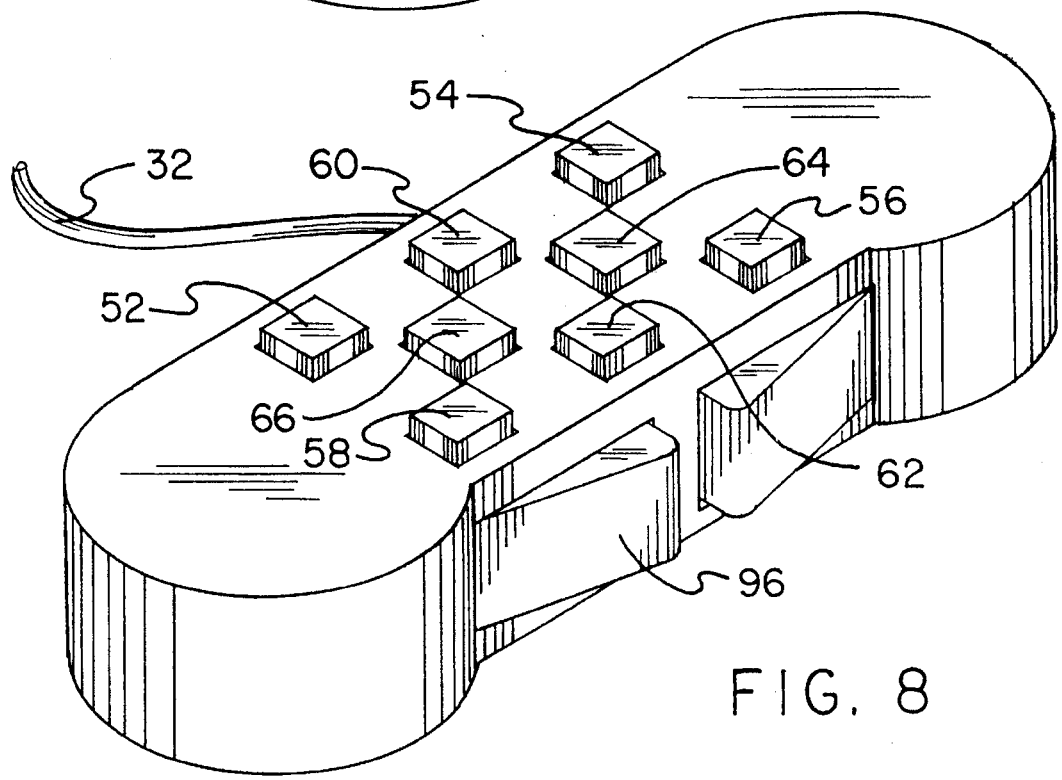
FIG. 8 is a perspective view of yet another alternate embodiment of the present invention depicting eight directional switches in a diagonal-type layout extended from the top wall of the housing and two toggle-type activation switches extended from the front wall of the housing.

A third embodiment of the present invention is shown in FIG. 8. The directional switches consist of a north switch 60, a south switch 62, an east switch 64, a west switch 66, a northwest switch 52, a northeast switch 54, a southeast switch 56, and a southwest switch 58. The north switch, south switch, east switch, and west switch are each located at a vertex of a first imaginary square disposed on the housing. The northwest switch, northeast switch, southwest switch, and southeast switch are each located at a vertex of a second imaginary square disposed on the housing. The centroid of the first imaginary square is aligned with the centroid of the second imaginary square. The second imaginary square is further rotated 45° with respect to the first imaginary square. This positioning essentially creates a diagonal-type configuration. The third embodiment also includes a pair of lockable actuation switches 96 extended from the front wall. The positioning of the switches in the preferred embodiment, second embodiment, and third embodiment allow ready actuation during play with minimal finger movements, thereby providing a user increased speed and accuracy. Furthermore, this switch positioning allows a user to play for extended periods of time without tiring.

The present invention is a key button pad for use with video games. The unique design allows the user to maintain positive control over diagonal movements as well as the standard up, down, left, and right movements. The present invention is rectangular in shape and is approximately four inches long by approximately two inches wide and has a thickness of about one inch. The top surface has an array of eight push buttons with the appropriate notations as to each respective direction. Indicia may be disposed on the housing for indicating such direction or the buttons may be formed for indicating such direction. Two additional buttons can be found on the front of the unit which control the firing action. All electronic components are concealed in a plastic housing, and the buttons are plastic as well.

To operate the present invention, the user simply holds the device comfortably in hand and, by using either one or both hands, controls the movements in the game. When one of the diagonal buttons is pushed, a direct contact is made to a diode and that signal is sent to the video game. The present invention is designed to take the place of the standard keypad or joystick controller usually associated with a computer game.

The present invention is a significant improvement over existing units because of its precise accuracy. Existing controllers use mechanical connection between two buttons to accomplish a diagonal movement, and this method is not dependable because it can fail or be too slow. The present invention is usable with all types of computer games, video games, and other such devices. It is also adapted for use by graphic artists and software developers. The present invention may also be used with flight simulators.

The push buttons of the present invention are square and black and have a side length of 0.47 inches. Single pull single throw switches are utilized. The diodes of the present invention may be formed of germanium with a 0.3 volt activation voltage or of silicon with a 0.7 volt activation voltage. The cable connector of the present invention is adapted to be connected with cables from a variety of computer systems or computer games.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and the manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modification and changes will readily occur to those skilled in the art, it is not desired to limit the invention to the exact construction and operation shown and described, and accordingly, all suitable modification and equivalents may be resorted to, falling within the scope of the invention.

What is claimed as being new and desired to be protected by Letters Patent of the United States is as follows:

1. A keypad controller for use with a video game for generating directional and activation signals for controlling the direction and activation of events during play of a video game comprising, in combination:

a housing having a bottom wall, top wall, and a periphery interconnecting the top wall with the bottom wall with the periphery further having a front wall, a rear wall, and two opposed and outwardly curved side walls defining handles for allowing a user a firm grip;

a cable connector extended from the rear wall of the housing and coupleable to a plug end of a cable for connection and communication with a video game, the cable connector having a north terminal, a south terminal, an east terminal, a west terminal, event terminal, and ground terminal;

eight depressible directional switches coupled to and extended from the top wall of the housing with four of the switches each located at a vertex of an imaginary square defined upon the top wall to thereby define a northwest switch, a northeast switch, a southeast switch, and a southwest switch and with the remaining four switches each generally positioned between each pair of vertices of the imaginary square to define a north switch, a south switch, an east switch, and a west switch, each switch having an cathode terminal and a anode terminal with each anode terminal coupled to the ground terminal of the cable connector and with the cathode terminal of the north switch coupled to the north terminal of the cable connector, the cathode terminal of the south switch coupled to the south terminal of the cable connector, the cathode terminal of the east switch coupled to the east terminal of the cable connector, and the cathode terminal of the west switch coupled to the west terminal of the cable connector;

a first diode, a second diode, a third diode, a fourth diode, a fifth diode, a sixth diode, a seventh diode, and an eighth diode with the first diode having an anode terminal coupled to the cathode terminal of the northwest switch and a cathode terminal coupled to the north terminal of the cable connector, the second diode having an anode terminal coupled to the cathode terminal of northeast switch and a cathode terminal coupled to the north terminal of the cable connector, the third diode having an anode terminal coupled to the cathode terminal of the northeast switch and a cathode terminal coupled to the east terminal of the cable connector, the fourth diode having an anode terminal coupled to the cathode terminal of the southeast switch and a cathode terminal coupled to the east terminal of the cable connector, the fifth diode having an anode terminal coupled to the cathode terminal of the southeast switch and a cathode terminal coupled to the south terminal of the cable connector, the sixth diode having an anode terminal coupled to the cathode terminal of the southwest switch and a cathode terminal coupled to the south terminal of the cable connector, the seventh diode having an anode terminal coupled to the cathode terminal of the southwest switch and a cathode terminal coupled to the west terminal of the cable connector, and the eighth diode having an anode terminal coupled to the cathode terminal of the northwest switch and a cathode terminal coupled to the west terminal of the cable connector and with depression of the north switch generating a north directional signal, depression of the south switch generating a south directional signal, depression of the east switch generating an east directional signal, depression of the west switch generating a west directional signal, depression of the northeast switch generating a north directional signal and east directional signal, depression of the southeast switch generating a south directional signal and an east directional signal, depression of the southwest switch generating a south directional signal and a west directional signal, and depression of the northwest switch generating a north directional signal and a west directional signal; and two pairs of actuation switches extended from the rear wall of the housing, each pair formed of a depressible action switch and a lock switch, the action switch having a cathode terminal coupled to the event terminal of the cable connector and an anode terminal connected to the ground terminal of the cable connector with depression of the action switch generating an activation signal, the lock switch coupled to the action switch and having an activated orientation for allowing the continual generation of the activation signal and a deactivated orientation for preventing such continual generation.

2. A keypad controller for use with a video game comprising:

a housing;

cable connector means extended from the housing and coupleable to a plug end of a cable for connection and communication with a video game;

a plurality of actuateable directional switches each coupled to the cable connector means and extended from the housing, each switch associated with a compass direction, each switch generating a unique signal when actuated for controlling the direction of events of a video game;

directional switches consisting of north switch, a south switch, an east switch, a west switch, a northwest switch, a northeast switch, a southwest switch, and a southeast switch with the north switch, south switch, east switch, west switch each located at a vertex of a first imaginary square disposed on the housing and with the northwest switch, northeast switch, southwest switch, and southeast switch each located at a vertex of a second imaginary square disposed on the .housing wherein the centroid of the first imaginary square is aligned with the centroid of the second imaginary square and wherein second imaginary square is rotated 45 degrees with respect to the first imaginary square; and a plurality of diodes coupled between the directional switches and further facilitating the cooperation of the directional switches.

* * * * *